UNITED STATES PATENT OFFICE.

RUDOLF PUMMERER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF GERMANY.

RED DYE AND PROCESS OF MAKING SAME.

No. 876,839.　　　　Specification of Letters Patent.　　　　Patented Jan. 14, 1908.

Application filed September 14, 1907. Serial No. 392,839.

To all whom it may concern:

Be it known that I, RUDOLF PUMMERER, doctor of philosophy and chemist, subject of the King of Bavaria, residing at Ludwigshafen-on-the-Rhine, Germany, have invented new and useful Improvements in Red Dyes and Processes of Making the Same, of which the following is a specification.

I have discovered that 2.3-diketo-dihydro-(1)-thionaphthene

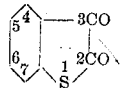

and its homologues and derivatives can be made to react with indoxyl, or with 3-oxy-(1) thionaphthene (formerly termed thioindoxyl),

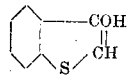

or with homologues and derivatives of these compounds and that thereby new coloring matters can be obtained which dye cotton, from a hydrosulfite vat, yielding shades which vary from blue to red according to the compounds employed. The reaction can be carried out by heating the said compounds together with or without, the presence of diluting agents, such for instance as naphthalene, nitrobenzene, and amylalcohol, and with, or without, the addition of a condensing agent, such for instance as acetic anhydrid, zinc chlorid, calcium chlorid and, in particular, mineral acids. Instead of the 3-oxy-(1)-thionaph-thene compounds, the corresponding arylthioglycollic acids, or the orthocarboxyl derivatives thereof, can be employed. The coloring matters obtainable as hereinbefore described can also be converted, by means of sulfonating agents, into their sulfonic acids which dye animal fiber from an acid bath, yielding blue-violet to brown-red shades.

My new coloring matters possess the following generic properties. They consist, when dry, of from violet to brownish red powders, they are soluble in benzene yielding from violet to yellowish red solutions, and in concentrated sulfuric acid yielding from brown to green solutions. They are soluble in alkaline hydrosulfite yielding vats which dye cotton from blue to red shades. In the form of their sulfoacids they die wool from blue-violet to brown-red shades.

The new coloring matter which I desire to claim specifically is that obtainable by acting on 2.3-diketodihydro-(1)-thionaphthene with 3-oxy-(1)-thionaphthene and it consists of a red powder which gives a yellowish red solution in benzene and an olive-brown solution in concentrated sulfuric acid. It dyes cotton from an alkaline hydrosulfite vat scarlet-red shades, and in its sulfonated form dyes wool red.

The following examples will serve to illustrate further the nature of my invention, which, however, is not confined to these examples. The parts are by weight.

Example 1. Melt together, for one (1) hour, at a temperature of one hundred and forty (140) degrees centigrade (while excluding air), one hundred and sixty-four (164) parts of 2.3-diketo-dihydro-(1)-thionaphthene and 150 parts of 3-oxy-(1)-thionaphthene. When the melt is cold, powder it and by treatment with hydrosulfite, or with sodium sulfid solution, purify the red coloring matter obtained.

Example 2. Pour together solutions of one hundred and sixty-four (164) parts of 2.3-diketo-dihydro-(1)-thionaphthene and one hundred and fifty (150) parts of 3-oxy-(1)-thionaphthene each in seven hundred (700) parts of boiling acetic anhydrid, and boil the whole for thirty (30) minutes in a reflux apparatus. Then pour it into ten thousand (10,000) parts of boiling dilute acetic acid and filter off and wash, with hot water, the coloring matter which separates out and which is identical with that obtained according to the foregoing Example 1.

Instead of 3-oxy-(1)-thionaphthene in the foregoing examples, the corresponding quantity of 3-oxy-(1)-thionaphthene-2-carboxylic acid can be employed.

Example 3. Boil together for one (1) hour in a reflux apparatus, while excluding air, one hundred and sixty-four parts (164) of 2.3-diketo-dihydro-(1)-thionaphthene, one hundred and thirty-three (133) parts of indoxyl and one thousand (1,000) parts of amylalcohol, then distil off the greater part of the amylalcohol, stir the residue with benzene and filter off the coloring matter which dyes cotton from the vat blue-violet shades. In this example, instead of indoxyl, the corresponding quantity of indoxylic acid can be used.

Example 4. Dissolve one hundred and seventy-nine (179) parts of 2.3 diketo-dihydro-(1)-thionaphthene-2-oxim

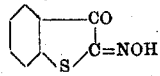

in the necessary quantity of boiling water, which preferably contains some acetic acid, add an aqueous solution of one hundred and thirty-three (133) parts of indoxyl and three thousand (3,000) parts of concentrated hydrochloric acid, boil the whole, and filter off and wash, with hot water, the coloring matter which dyes cotton, from the vat, blue shades.

Example 5. Dissolve carefully one (1) part of the coloring matter obtained according to the foregoing Example 4 in ten (10) parts of concentrated sulfuric acid, or in two (2) parts of twenty-three (23) per cent. oleum, and allow the solution to stand at ordinary temperature until a test portion yields a clear solution in water. Then pour the reaction mixture into fifty (50) parts of ice-cold concentrated salt solution and filter off and wash, with salt solution, the sulfonic acid which separates out.

Example 6. Boil together for two (2) hours in a reflux apparatus, two hundred and twelve (212) parts of ortho-carboxy-phenyl-thioglycollic acid, one hundred and sixty-four (164) parts of 2.3-diketo-dihydro-(1)-thionaphthene, two thousand (2,000) parts of acetic anhydrid and forty (40) parts of anhydrous sodium acetate. Then pour the reaction liquid into ten thousand (10,000) parts of boiling water and filter off and wash, with hot water, the coloring matter which separates out in red flakes.

In a similar manner to those described in the above examples, coloring matters can be obtained from 5-chlor-2.3-diketo-dihydro-(1)-thionaphthene-2-oxim

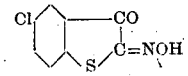

or from 5.7-dimethyl-2.3-diketo-dihydro-(1)-thionaphthene

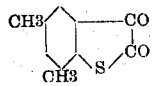

or from 5-chlor-2.3-diketo-dihydro-(1)-thionaphthene

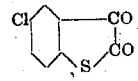

or from other derivatives of 2.3-diketo-dihydro-(1)-thionaphthene.

Now what I claim is:

1. The process of producing coloring matter by acting on a 2.3-diketo-dihydro-(1)-thionaphthene compound with an indoxylic compound.

2. The process of producing coloring matter by acting on 2.3-diketo-dihydro-(1)-thionaphthene with 3-oxy-(1)-thionaphene.

3. The process of producing coloring matter by acting on 2.3-diketo-dihydro-(1) thionaphthene with 3-oxy-(1)-thionaphthene in the presence of a condensing agent.

4. As new articles of manufacture the coloring matters which can be obtained by acting on a 2.3-diketo-dihydro-(1)-thionaphthene compound with an indoxylic compound, which coloring matters consist when dry of from violet to brownish red powders and are soluble in benzene yielding from violet to yellowish red solutions and in concentrated sulfuric acid yielding from brown to green solutions and are soluble in alkaline hydrosulfite yielding vats which dye cotton from blue to red shades, and in the form of their sulfoacids dye cotton from blue-violet to brown-red shades.

5. As a new article of manufacture the coloring matter which can be obtained by acting on 2.3-diketo-dihydro-(1)-thionaphthene with 3-oxy-(1)-thionaphthene, which coloring matter consists when dry of a red powder and gives a yellowish red solution in benzene and an olive-brown solution in concentrated sulfuric acid, and dyes cotton from an alkaline hydrosulfite vat scarlet-red shades and in its sulfonated form dyes wool red.

In testimony whereof I have hereunto set my hand in the presence of two subscribing witnesses.

RUDOLF PUMMERER.

Witnesses:
J. ALEC. LLOYD,
JOS. H. LEUTE.